Feb. 14, 1933.  L. GERARD  1,897,898
AUTOMATIC PRESSURE REGULATING DEVICE
Filed Feb. 19, 1931  4 Sheets-Sheet 3

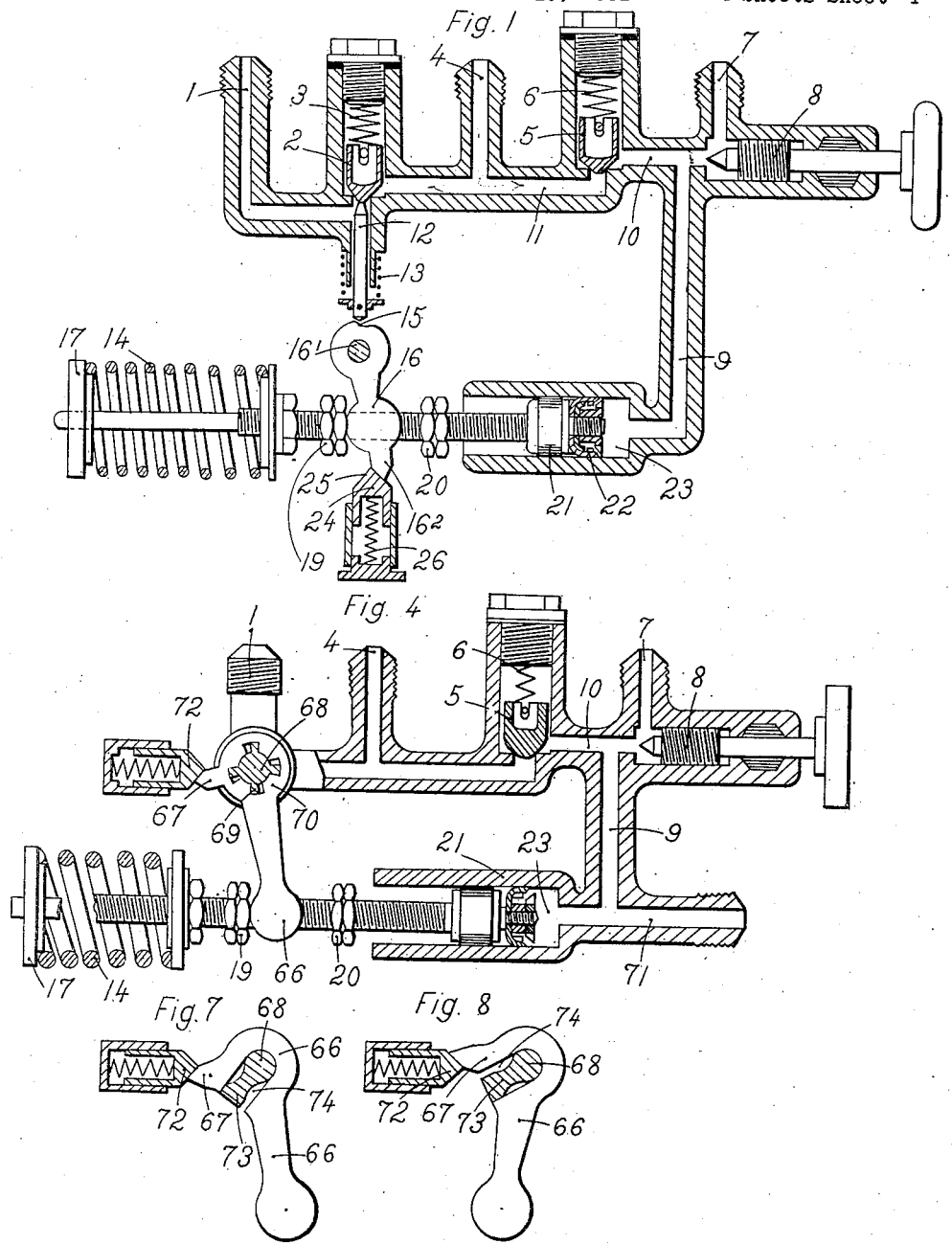
Feb. 14, 1933. L. GERARD 1,897,898
AUTOMATIC PRESSURE REGULATING DEVICE
Filed Feb. 19, 1931 4 Sheets-Sheet 1

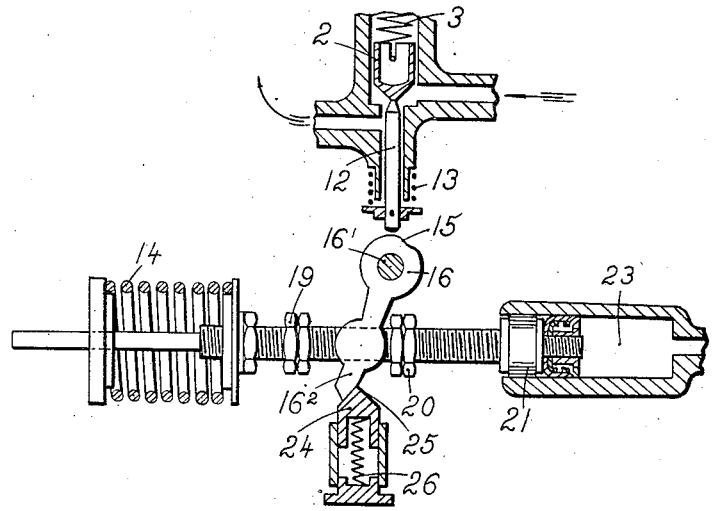
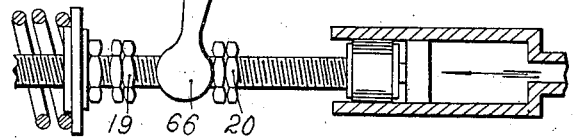
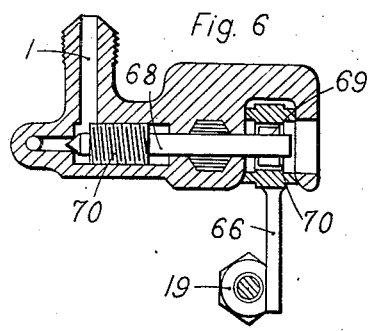

L. Gerard
INVENTOR
By Marks & Clerk
Attys.

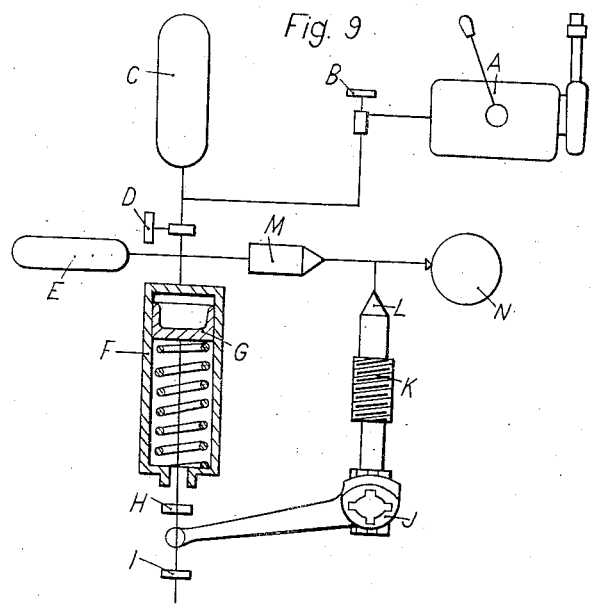
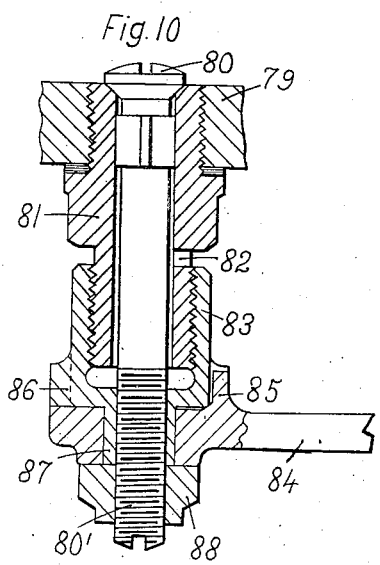

Patented Feb. 14, 1933

1,897,898

UNITED STATES PATENT OFFICE

LÉON GERARD, OF SÈVRES, FRANCE, ASSIGNOR TO PAUL VIET, OF BILLANCOURT, SEINE, FRANCE

AUTOMATIC PRESSURE REGULATING DEVICE

Application filed February 19, 1931, Serial No. 517,064, and in France March 8, 1930.

The present invention relates to an automatic pressure-regulating device by which a compressor may be placed in operation entirely without load, when the proper degree of compression is attained, and will only operate under load when the degree of compression is much reduced.

The following description, with reference to the accompanying drawings which are given by way of example, relates to various embodiments of the invention.

Fig. 1 is a diagrammatic sectional view of an automatic regulating device in its position of minimum pressure, or when the compressor is operating under load.

Fig. 2 is a like view, in the position of maximum pressure, or when the compressor is operating entirely without load.

Fig. 3 shows by way of example the general arrangement of the compressor, with the emergency hand pump, the automatic regulating device, and the various pipes connecting the same with the tanks, also providing for the use of compressed air for starting, fire extinguishing, tire inflation, and the like.

Fig. 4 shows a modified device for controlling the needle-valve, affording an atmospheric outlet. The position here represented is the one which corresponds to a low pressure in the air tank, that is, when the compressor is working with full power.

Fig. 5 is a view analogous to Figure 4 corresponding to the maximum pressure in the reservoir, with the compressor working without load due to the opening of the needle-valve.

Fig. 6 is a lengthwise section of the discharge valve.

Figure 3:
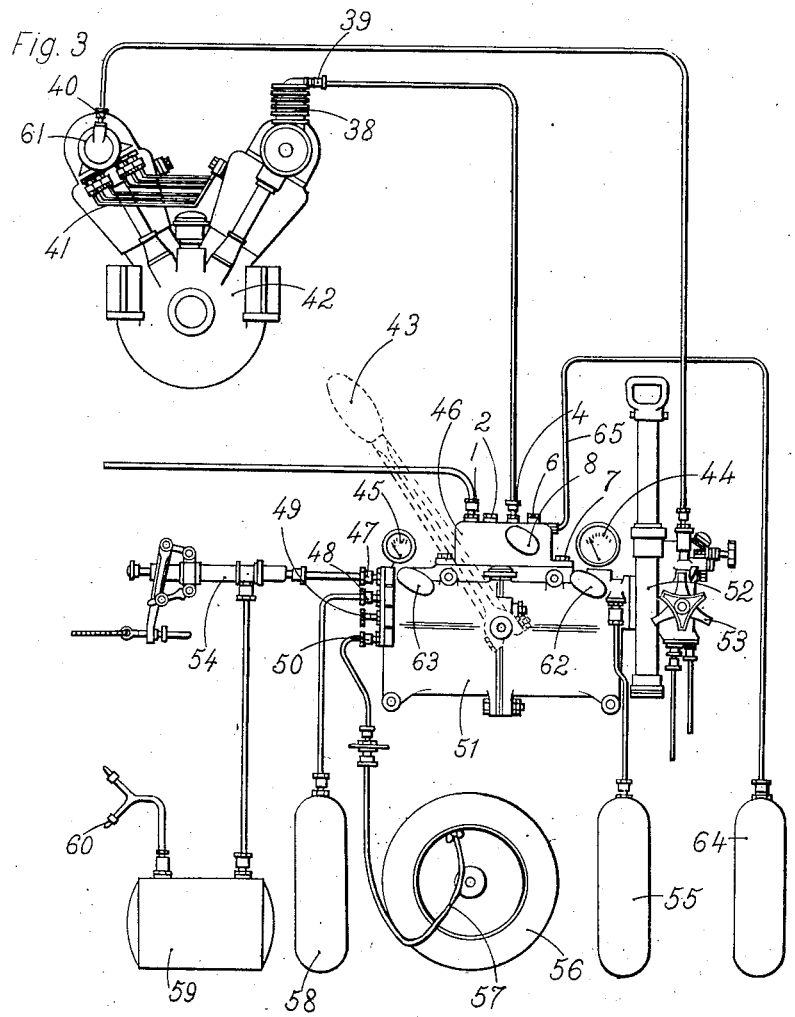

Figs. 7 and 8 show a modified form of the lever control of the discharging needle-valve.

Fig. 9 is a diagrammatic view showing the general arrangement of the pump, compressor and regulator, and the circuit connecting these various apparatus.

Fig. 10 shows a modified form of the discharging clack-valve or needle valve, in which this is so mounted that the pressure of the compressed air will always act upon the head of the valve, thus preventing all improper opening of the latter.

Referring to Fig. 1, it will be observed that the automatic regulating device comprises a conduit 4 for the admission of compressed air from the compressor, and which leads into a main conduit 11.

At one end of said conduit is a discharge valve 2 which is urged upon its seat by a spring 3, and when the said valve lifts, the air from the compressor can be discharged through the conduit 1 when the desired maximum pressure is attained; at the other end of the conduit is a clack valve 5 which is urged upon its seat by a spring 6 and serves to cut off the compressed air tank which is connected with a neck 7 leading to a conduit 10, when the valve 2 has ceased to operate for the discharge. The said air tank is more completely cut off by a screw needle valve 8 which closes the conduit 10 should the valve 5 not be perfectly leakless. It is thus observed that the compressed air from the compressor which is admitted at 4, will pass through the conduit 11, then raising the valve 5 and proceeding through the conduit 10 and thence through the conduit 9, whether the compressed air tank connected at 7 be in communication or not.

The conduit 9 communicates with a cylindrical chamber 23 containing a piston 21 which is made absolutely leakless by leather packing 22 and a felt lubricating packing. At the end of the piston is a screwthreaded rod upon which are mounted two regulating nuts 19—20. Between the said nuts, and on the said rod, is mounted a forked lever 16 which is pivoted at 16¹ and carries on its pivoting hub a ramp 15 cooperating with a tappet 12 which is adapted to push the valve 2 against the action of a spring 13.

The end of the said screwthreaded rod secured to the piston is controlled by a spring 14 which bears against a stationary part 17, and the pivoting of the lever 16 on its axle 16¹ is furthered by the action of a spring plunger 24 cooperating with the beveled end 16² of the lever 16, which end is in constant contact with one face of a beveled part 25 formed at the end of said plunger 24 provided with a spring 26.

When the piston 21 is moved, the nut or stop 20 acts upon the lever 16 and turns it upon its axle $16^1$, and thus the beveled end $16^2$ will drive down the said plunger by its beveled part 25, against the action of the spring, but when the two beveled parts have been displaced so that their respective pointed ends move beyond the middle point, the spring 26 expands with great force and causes the beveled part 25 to make contact with the beveled portion $16^2$, thus instantly turning the lever. The ramp 15 thus acts upon the tappet 12 which abruptly lifts the valve 2 from its seat with great force. It will be observed that this arrangement advantageously increases the displacement of the piston which acts by its stops upon the lever 16.

The operation of the said device is as follows:

The compressed air from the compressor enters the conduit 9 and thus proceeds into the chamber 23 and drives forward the piston 21 whose stop 20 thus turns the lever 16 on its axle $16^1$, and hence the ramp 15 will act upon the tappet 12 which rises and lifts the valve 2 from its seat, and thus the conduit 10 which is in direct communication with the compressor, is connected with the conduit 1 which opens into the atmosphere. In this case, the several parts of the self-regulating apparatus have the position shown in Fig. 2.

When the pressure reaches the minimum value, the piston 21 is driven back in the said chamber 23 by the action of the spring 14; the stop 19 acts upon the lever 16 and turns it upon its axle $16^1$; as the tappet 12 is no longer acted upon, it is downwardly displaced by the action of the spring 13 and the valve 2 thus drops upon its seat, again cutting off the connection between the conduits 11 and 1, so that the compressor will again operate normally.

It will be observed that during the operation of the device, and between the maximum and minimum limits for which the spring 14 and the stops 19—20 have been adjusted, the compressor will operate entirely without load, and thus with the minimum amount of wear upon the parts in movement and of its controlling means.

The piston 21 may be replaced by a diaphragm which is subject to the direct action of the compressed air entering through the conduit 9; said diaphragm will act in turn upon a plunger adapted to actuate a lever controlling the rise of the tappet 12 by suitable means.

Fig. 3 shows by way of example the general arrangement of the automatic regulating device upon an airplane.

42 is the engine, upon which is mounted the compressor 38 and the starting device 61 whose discharge conduits 41 are connected with a clack valve mounted on the engine cylinders, whilst the admission end 40 is connected with a sprayer 53. The injection pump is shown at 52, and the emergency hand pump at 51, with its operating lever 43; it is provided with the coupling members 47 connecting it with the automatic or semi-automatic controlling apparatus 54 used against fires, which is connected with a tank of fire-extinguishing liquid 59 provided with the outlets 60. From the outlet 48, the compressed air proceeds into the tank 58.

49 is a needle valve for the control of the compressed air supply, with the use of the coupling member 50, for instance for the inflation of the tires 56 of the landing gear, by means of the flexible hose 57, or for other purposes.

The pressure gauge 45 shows the internal pressure in the extinguishing tank 58; the gauge 44 shows the pressure in the starting tank 55.

The automatic regulating device is shown at 46 and it is mounted on the hand pump 51; it is connected at 4 with the coupling device 39 mounted on the compressor 38. As before, 1 is the atmospheric outlet and 2 the discharge valve; 6 is the clack valve and 8 the needle-valve for cutting off the compressor; 62 and 63 are needle-valves for controlling purposes; 64 is a service tank which is connected at 65 with the said automatic regulating device.

The spring valve 2 affording communication with the atmospheric conduit 1 may be replaced by a needle-valve which is controlled by the rotation of a rod actuated by a lever under the alternate control of stops 19 and 20.

An arrangement of this kind is shown in Figs. 4 and 5.

As shown in Figures 4 and 5, the lever 66, which is analogous to the lever 16, is provided with a reaction arm 67 having a beveled end. The lever 66 is centered upon a needle valve 68 which is secured to a cross-shaped member whose arms or projections 69 can make contact, with suitable clearance, with the sides 70 of the recesses of a lever 66. When said valve, which has a threaded part 70, is rotated, it will move in one direction or the other, making or breaking the connection with the atmosphere. A coupling member 71 serves for the circulation of the compressed air into an additional service tank.

The said arm 67 makes contact with a spring-mounted arm 72 analogous to the one shown in Figures 1 and 2.

In Figures 7 and 8, the spider 69 which is secured to the valve 68 is replaced by a stud 73 of sufficient size to provide for the regulating and adapted to make contact at the right or left with the sides of an aperture 74 in the lever 66.

Fig. 9 shows the same hand pump A which may serve as a standby in the case of failure of the compressor; also the needle-valve B of the pump, and the main compressed air tank C, and this group of devices may be separated from the compressing and regulating group, by the needle-valve D which stops the compressor. This second group for compressing and regulating comprises a compressor N and needle-valve L, controlled by a piston G controlled by the pressure of the compressed air on the one hand, and by the compression of a calibrated spring F on the other hand, through the medium of stops H and I operating the lever J which is slidable on the needle-valve L, and this latter, during the opening and closing movement, bears upon a screw K.

Between the cylinder containing the piston G and the discharging needle-valve L is a clack-valve M which prevents all return of air and all loss of pressure in the compressor and the said needle-valve L when in the open position.

An additional tank E is mounted immediately in front of the said needle-valve D of the compressor, and is positioned in the circuit of the compressed air between the cylinder G and the needle-valve M.

In the construction shown in Figure 10, the clack-valve 80 is always subjected to the action of the pressure of the compressed air contained in the regulator. For this purpose, the discharging clack-valve 80 is mounted within a casing 81 screwed to the wall of the regulator 79; the lower end of said casing 81 is tapped with a quick-acting thread cooperating with a nut 83, into which is screwed the stem 80¹ of the valve 80. A lever 84 is adapted to turn freely upon the nut 83 at 87, and said lever 84 has projections 85 cooperating with like projections 86 provided on the nut 83. A nut 88 holds the rod 80¹ of the valve 80 upon the nut 83, and it also maintains the lever 84; said lever acts by its projections 85 upon the projections 86 of the nut 83 and thus turns said nut upon the casing 81; in this movement, it lifts the stem 80¹ of the valve 80, thus giving passage to the compressed air contained in 79, which can thus be discharged through the orifice 82. The said lever is displaced in a manner analogous to what has been described for the levers 16 and 66.

I claim:

1. In an automatic pressure regulating device of the type having a main conduit supplied by a compressor and having a tank communicating with one end of the conduit, a discharge valve at the other end of the main conduit, means for moving said discharge valve to an open or closed position, a retaining clack valve in said conduit in advance of the tank, a cylinder communicating on one hand with said tank and on the other hand with the main conduit through said retaining clack valve, a piston operating in said cylinder and including a resiliently actuated stem, and two members adjustably mounted on the stem of said piston and acting against the moving means of the discharge valve for controlling the position of the discharge vlave.

2. An automatic pressure regulating device as claimed in claim 1, wherein the discharge valve includes a spring actuated slidable body and wherein the moving means includes a spring controlled tappet, and a rockably mounted spring actuated lever associated with the tappet and positioned about the stem of the piston between the adjustable members.

3. An automatic regulating device as claimed in claim 1, wherein the discharge valve includes a threaded needle-like body having a stem, and wherein the means for actuating the lever includes a spring actuated lever having a lost motion connection with the valve stem and having one end associated with the stem of the piston between said adjustable members.

4. An automatic pressure regulating device as claimed in claim 1, wherein the discharge valve includes a head located wholly within the main conduit in such manner that the pressure of the conduit maintains the valve on its seat.

5. An automatic pressure regulating device as claimed in claim 1, wherein the discharge valve moving means includes a pivoted lever provided with a bevelled and pointed extension, and a spring actuated plunger provided with a corresponding bevelled and pointed end for effecting quick action of said lever when operated, substantially as and for the purposes set forth.

6. An automatic pressure regulating device as claimed in claim 1, wherein the discharge valve is in the form of a threaded needle body provided with a stem, projections in the form of a cross-shaped member on said stem, and wherein the means for actuating the valve includes a spring actuated lever having cross-shaped recesses for lost motion action with the projections and having its outer end positioned adjacent the stem of the piston and between the adjustable members.

In testimony whereof I have signed this specification.

LÉON GERARD.